(12) United States Patent
Yamada et al.

(10) Patent No.: US 11,311,037 B2
(45) Date of Patent: Apr. 26, 2022

(54) METHOD FOR PRODUCING INSTANT FRIED NOODLES

(71) Applicant: NISSIN FOODS HOLDINGS CO., LTD., Osaka (JP)

(72) Inventors: Yusuke Yamada, Osaka (JP); Takayuki Yagi, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 320 days.

(21) Appl. No.: 16/082,828

(22) PCT Filed: Feb. 28, 2017

(86) PCT No.: PCT/JP2017/007646
§ 371 (c)(1),
(2) Date: Sep. 6, 2018

(87) PCT Pub. No.: WO2017/154656
PCT Pub. Date: Sep. 14, 2017

(65) Prior Publication Data
US 2019/0082723 A1    Mar. 21, 2019

(30) Foreign Application Priority Data

Mar. 7, 2016 (JP) .............................. JP2016-043210

(51) Int. Cl.
*A23L 7/113* (2016.01)
*A23L 7/109* (2016.01)
*A23L 3/40* (2006.01)

(52) U.S. Cl.
CPC ................. *A23L 7/113* (2016.08); *A23L 3/40* (2013.01); *A23L 7/109* (2016.08)

(58) Field of Classification Search
USPC .................................................. 426/557, 451
See application file for complete search history.

(56) References Cited

U.S. PATENT DOCUMENTS 4,230,735 A * 10/1980 Yoshida .................. A23L 7/109
426/113
5,120,556 A    6/1992 Fujimoto et al.
(Continued)

FOREIGN PATENT DOCUMENTS

| CN | 1907100   | 2/2007 |
| CN | 104738423 | 7/2015 |

(Continued)

OTHER PUBLICATIONS

International Search Report and Written Opinion of the ISA (Forms PCT/ISA/210 and PCT/ISA/237) issued in International Application No. PCT/JP2017/007646, dated May 30, 2017, 9 pages with an English translation of the ISR.

(Continued)

*Primary Examiner* — Lien T Tran
(74) *Attorney, Agent, or Firm* — Hamre, Schumann, Mueller & Larson, P.C.

(57) ABSTRACT

A method for producing instant fried noodles with which puffing of the noodles are prevented compared with ordinary fried noodles is provided. The instant fried noodles made by the method thus can have dense texture and high transparency. In the method, a noodle belt is prepared from noodle dough obtained by kneading a main raw material powder with 20 to 60 ml, more preferably 30-50 ml, of a liquid-form edible fat or oil added per kg of the main raw material powder; the noodle belt is rolled out into a determined noodle thickness by performing rolling operation three times or less, more preferably twice or less; the rolled noodle belt is cut into noodle strings using a cutting blade; and the noodle strings are steamed and fry drying.

2 Claims, 4 Drawing Sheets

(56) References Cited

U.S. PATENT DOCUMENTS

| | | | |
|---|---|---|---|
| 5,500,236 A | 3/1996 | Miller et al. | |
| 2005/0266136 A1* | 12/2005 | Kurachi | A47J 43/04 |
| | | | 426/557 |
| 2011/0229613 A1 | 9/2011 | Takizawa et al. | |
| 2012/0003376 A1* | 1/2012 | Alam | A23L 7/113 |
| | | | 426/557 |
| 2012/0207897 A1 | 8/2012 | Ishii et al. | |
| 2012/0288607 A1* | 11/2012 | Takahashi | A23L 7/113 |
| | | | 426/557 |
| 2013/0059046 A1 | 3/2013 | Yamaya et al. | |
| 2013/0122173 A1 | 5/2013 | Nagayama | |
| 2013/0287921 A1 | 10/2013 | Nagayama | |
| 2016/0249652 A1 | 9/2016 | Tanaka et al. | |
| 2017/0280753 A1 | 10/2017 | Kitano et al. | |
| 2018/0206507 A1* | 7/2018 | Ng | A23L 7/109 |

FOREIGN PATENT DOCUMENTS

| | | |
|---|---|---|
| EP | 3053455 | 8/2016 |
| JP | 55-064773 | 5/1980 |
| JP | 59-025655 | 2/1984 |
| JP | 3-066792 | 3/1991 |
| JP | 6-237719 | 8/1994 |
| JP | 2000-245377 | 9/2000 |
| JP | 3195740 | 8/2001 |
| JP | 4772160 B | 9/2011 |
| JP | 2014-012016 | 1/2014 |
| WO | 2011/114690 | 9/2011 |
| WO | 2015/050121 | 4/2015 |
| WO | 2017/043187 | 3/2017 |

OTHER PUBLICATIONS

Decision to Grant issued in corresponding Japanese Patent Application Serial No. 2016-043210, dated May 15, 2018, 4 pages.

The extended European Search Report issued for European Patent Application No. 17762996.1, dated Oct. 22, 2019, 10 pages.

Guoquan Hou et al., "Asian Noodle Technology", Asian Noodle—Technical Bulletin, vol. XX, No. 12, pp. 1-10, Dec. 1, 1998, URL:https://secure.aibonline.org/catalog/example/V20Iss12.pdf.

L. Popper et al., "23.2 Asian Wheat Noodles", The future of flour, pp. 1-24, Jan. 1, 2006, 24 pages, URL:https://muehlenchemie.de/downloads-future-of-flour/FoF Kap 23-2.pdf.

Office Action issued for Chinese Patent Application No. 201780012103.1, dated Feb. 3, 2019, 10 pages including English translation.

Office Action issued for Brazilian Patent Application No. BR112018068109-1, dated Nov. 3, 2021, 8 pages including English translation.

* cited by examiner

METHOD FOR PRODUCING INSTANT FRIED NOODLES

TECHNICAL FIELD

The present invention relates to a method for producing instant fried noodles.

BACKGROUND ART

Conventionally, a method for producing dried instant noodles is roughly divided into a method for fried noodles and a method for non-fried noodles. Fried noodles refer to noodles obtained by drying gelatinized noodles by frying in oil at about 150° C. On the other hand, non-fried noodles refer to noodles obtained by drying gelatinized noodles by a method different from frying in oil, and there are several methods, among which a hot-air drying method in which the drying is performed with hot air at about 70 to 100° C. at a velocity of 4 m/s or less for about 30 minutes to 90 minutes is generally employed. Aside from such dried instant noodles, there are fresh type instant noodles to which storability is imparted by adjusting with an acid, and fully sealing and heat-sterilizing the resultant.

As for fried noodles, moisture contained in the noodles evaporates during a frying treatment so that the resultant noodles can attain a puffed porous structure, and therefore, the fried noodles are good in reconstitutability and are characterized in snack-like flavor peculiar to the fried noodles owing to an oil. Thus, a variety of types of instant fried noodles including those served in plastic bags or cup-shaped containers are currently commercially available. The fried noodles are, however, insufficient in clearness due to the porous structure, and are therefore not suitable for producing noodles having denseness and clearness like pastas and spaghettis. Therefore, as pasta-like or spaghetti-like instant noodles having denseness and clearness, non-fried noodles and fresh type instant noodles have been mainly employed (for example, Literatures 1 to 3).

CITATION LIST

Patent Literature

[Patent Literature 1] Japanese Patent No. 4772160
[Patent Literature 2] Japanese Patent Laid-Open No. 6-237719
[Patent Literature 3] Japanese Patent Laid-Open No. 10-93459

SUMMARY OF INVENTION

Technical Problem

An object of the present invention is to provide a method for producing instant fried noodles that are inhibited from puffing as compared with usual fried noodles, and thus have a texture with denseness and high clearness.

Solution to Problem

The present inventor has thought that it is necessary to inhibit fried noodles from puffing for producing fried noodles having a texture with denseness and high clearness like those of pastas and spaghettis. Therefore, the present inventor has made earnest examinations on a method for inhibiting the puffing, resulting in accomplishing the present invention.

Specifically, the present invention provides a method for producing instant fried noodles, in which a noodle belt is prepared from a noodle dough obtained by kneading a main raw material powder with 20 to 60 ml of a liquid-form edible fat or oil added per kg of the main raw material powder, the noodle belt is rolled out into a prescribed noodle thickness by performing rolling operation three times or less, the rolled noodle belt is cut into noodle strings using a cutting blade, and the noodle strings are steamed and fry drying.

In the present invention, the number of times of performing the rolling operation for the noodle belt is preferably twice or less.

In the present invention, an amount of the liquid-form edible fat or oil added is preferably 30 to 50 ml per kg of the main raw material powder.

Advantageous Effects of Invention

According to the present invention, a method for producing instant fried noodles that are inhibited from puffing as compared with usual fried noodles, and thus have a texture with denseness and high clearness can be provided.

DESCRIPTION OF EMBODIMENT

Figure 1:
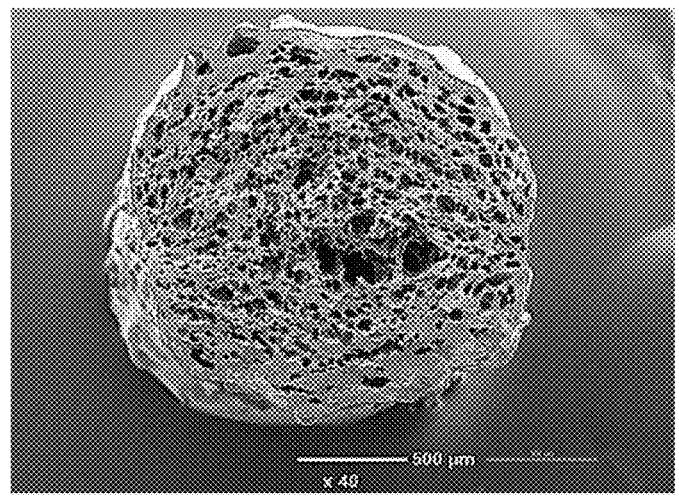
FIG. 1 is an electron micrograph of a representative cross section of noodles of Example 1 of the present invention.
Figure 2:
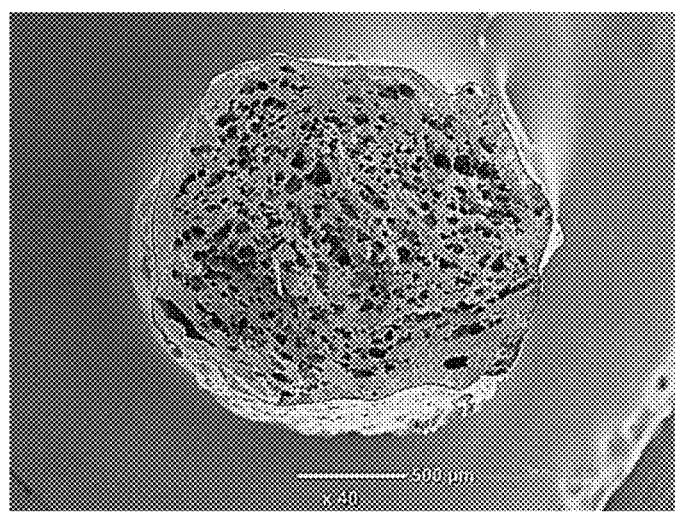
FIG. 2 is an electron micrograph of a representative cross section of noodles of Example 2 of the present invention.
Figure 3:
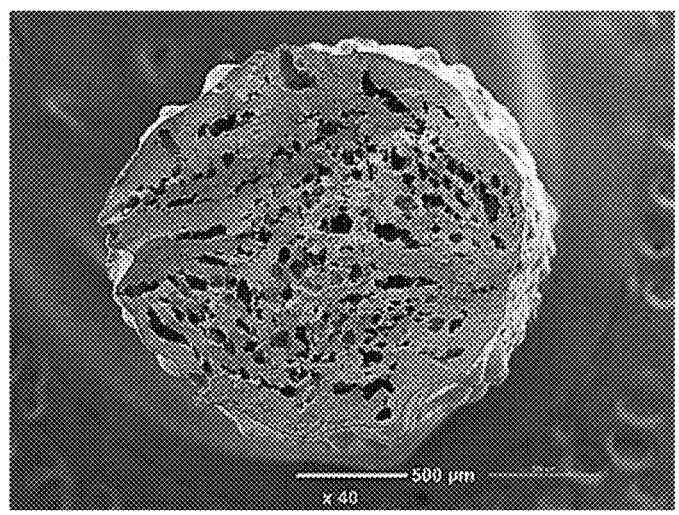
FIG. 3 is an electron micrograph of a representative cross section of noodles of Example 3 of the present invention.
Figure 4:
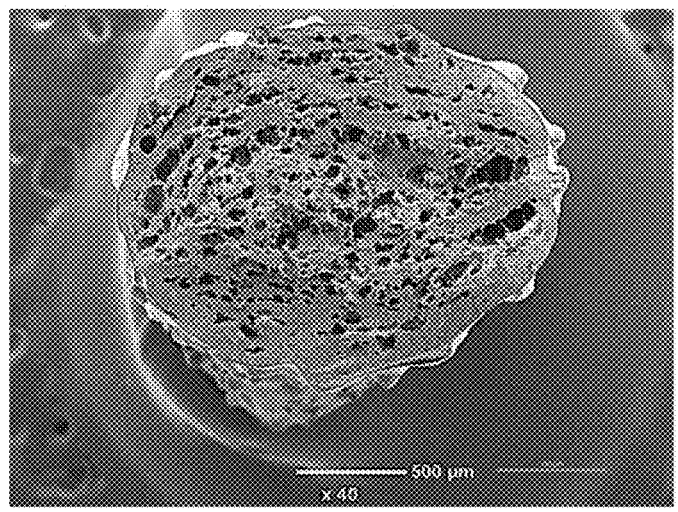
FIG. 4 is an electron micrograph of a representative cross section of noodles of Example 4 of the present invention.
Figure 5:
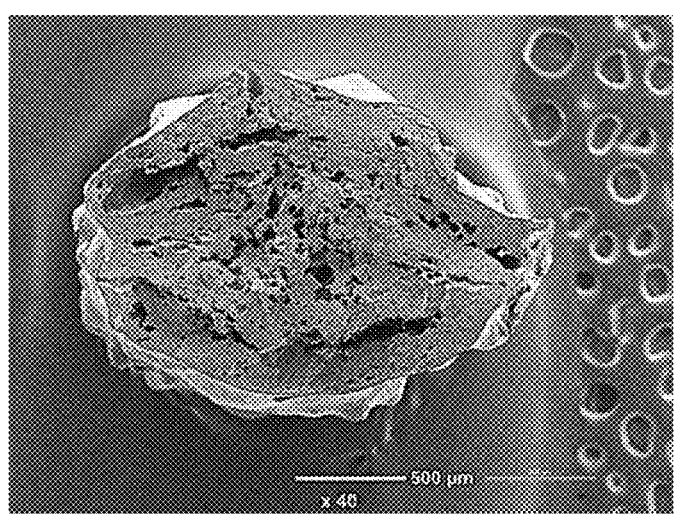
FIG. 5 is an electron micrograph of a representative cross section of noodles of Example 5 of the present invention.
Figure 6:
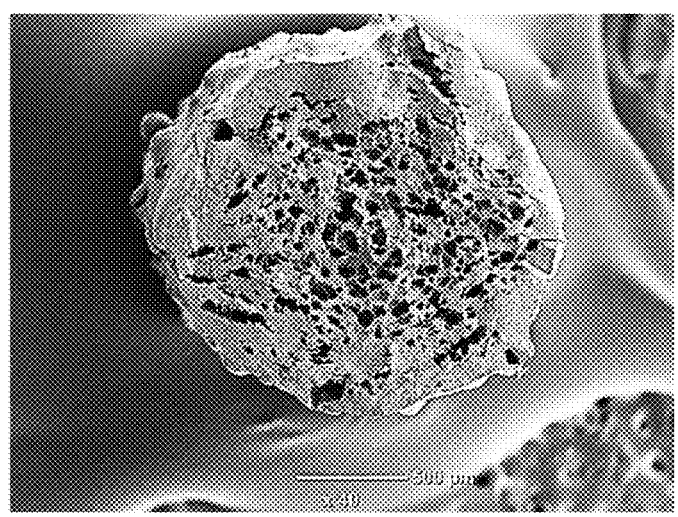
FIG. 6 is an electron micrograph of a representative cross section of noodles of Example 6 of the present invention.
Figure 7:
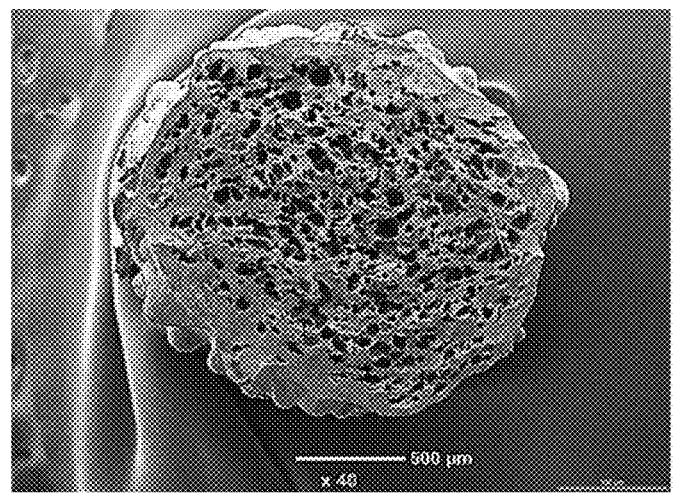
FIG. 7 is an electron micrograph of a representative cross section of noodles of Example 7 of the present invention.
Figure 8:
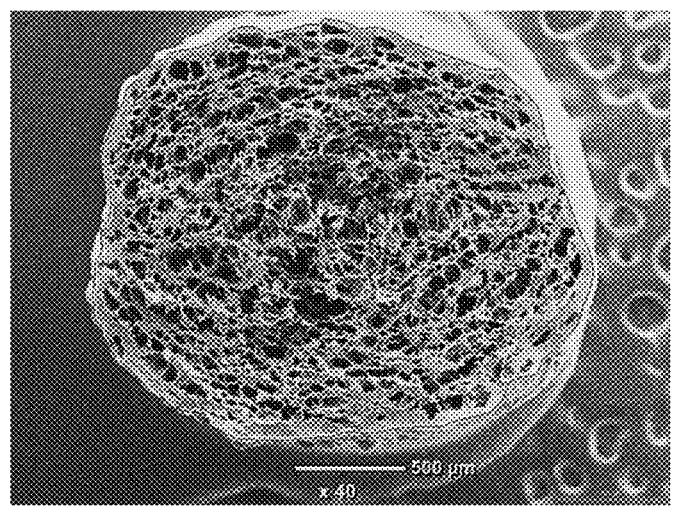
FIG. 8 is an electron micrograph of a representative cross section of noodles of Comparative Example 1 of the present invention.
Figure 9:
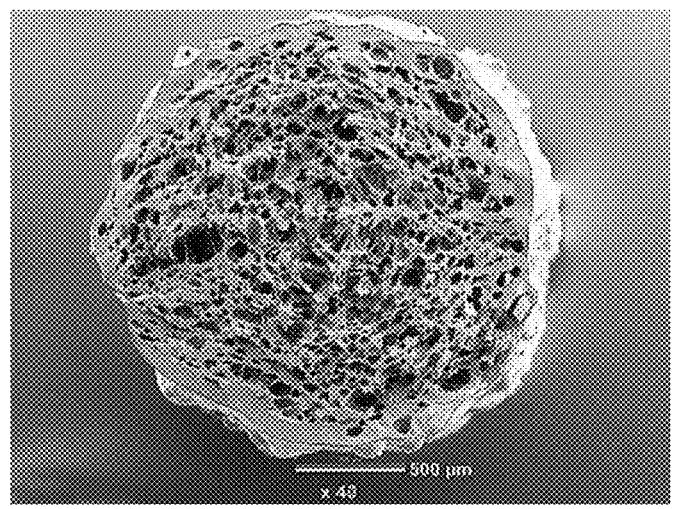
FIG. 9 is an electron micrograph of a representative cross section of noodles of Comparative Example 2 of the present invention.
Figure 10:
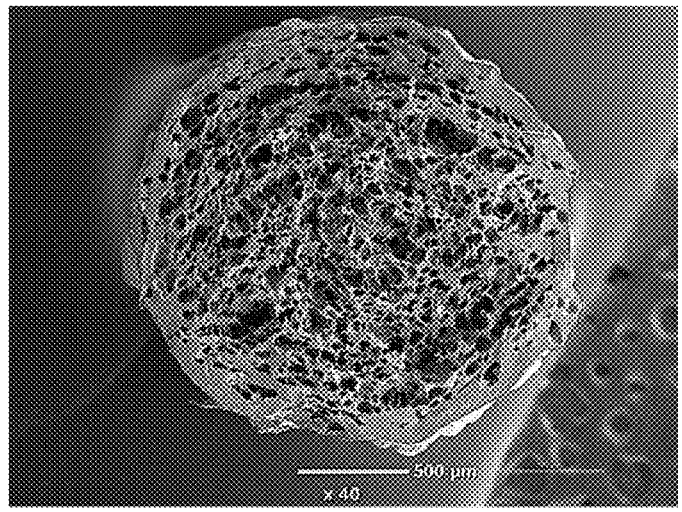
FIG. 10 is an electron micrograph of a representative cross section of noodles of Comparative Example 3 of the present invention.
Figure 11:
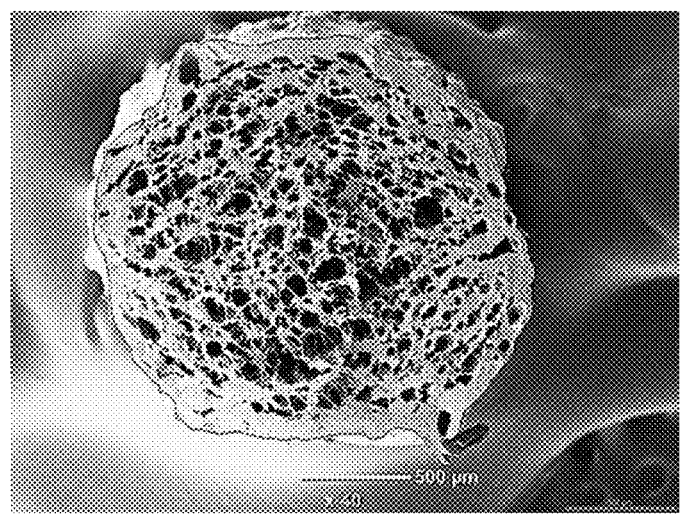
FIG. 11 is an electron micrograph of a representative cross section of noodles of Comparative Example 4 of the present invention.
Figure 12:
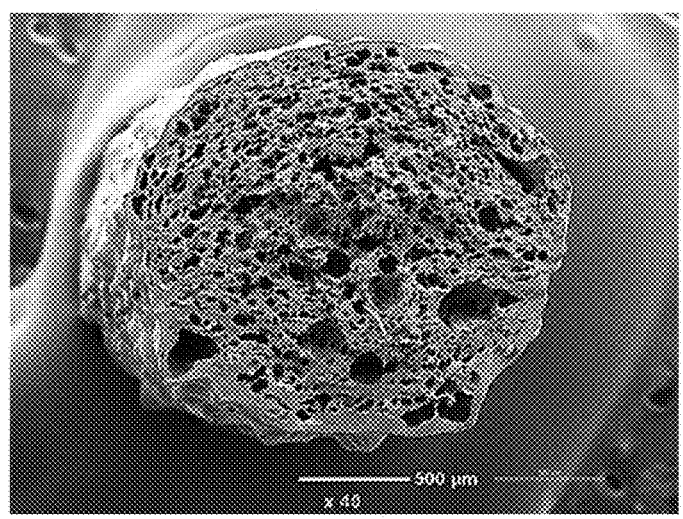
FIG. 12 is an electron micrograph of a representative cross section of noodles of Comparative Example 5 of the present invention.

The present invention will now be described in detail. It is noted a the present invention is not limited to the following description.

Incidentally, the type of instant fried noodles produced in the present invention is mainly, but is not especially limited to, pastas or spaghettis, and may be any one of those usually known in the technical field. Examples thereof include udon (wheat noodles), soba (buckwheat noodles) and Chinese noodles.

1. Raw Material Formulation

For the instant fried noodles of the present invention, any of raw materials of usual instant noodles can be used. Specifically, as a main raw material powder, a single one of or a mixture of flours such as a wheat flour (including durum flour), a buckwheat flour and a rice flour, and various starches such as a potato starch, a tapioca starch and a corn starch may be used. As the starch, a raw starch, a gelatinized starch, or a modified starch such as an acetylated starch, an etherified starch, or a crosslinked starch can be used.

Besides, in the present invention, any of a salt, an alkaline agent, phosphates, various thickeners, a noodle quality modifier, edible fats and oils, a pH adjuster, various pigments and the like that are generally used in production of instant noodles can be added as a sub raw material to the main raw material powder. Such an additional component may be added together with the raw material powder, or may be dissolved or suspended in kneading water for the addition.

The edible fats and oils used as the raw material of the present invention may be any one of edible fats and oils that are in a liquid form at the time of the addition, and a fat or oil in a liquid form at ordinary temperature, or a fat or oil in a liquid form obtained by heating and melting a semi-solid form or a solid form at ordinary temperature may be used. Examples of the types of the fats and oils include soybean oil, refined rice oil, rapeseed oil, palm oil, corn oil, olive oil, sunflower oil, sesame oil, lard and beef tallow. In consideration of storability of the fried noodles, a fat or oil in a liquid form or in a semi-solid form at ordinary temperature, such as lard or palm oil, is preferred, and such a fat or oil may be melted by heating if necessary to be used in a liquid form.

The amount of the edible fat or oil added that is used as the raw material of the present invention is preferably 20 to 60 ml per kg of the main raw material powder. When the amount is less than 20 ml, the sufficient effect of inhibiting the puffing cannot be obtained. When the amount exceeds 60 ml, noodle making becomes difficult and the resultant texture becomes poor. More preferably, the amount is 30 to 50 ml per kg of the main raw material.

2. Preparation of Dough

A method for preparing a noodle dough in the present invention may be performed in accordance with an ordinary method. Specifically, the noodle material powder and kneading water are kneaded with a batch mixer, a flow jet mixer, a vacuum mixer or the like to homogeneously mix them, and thus, a crumbly dough may be prepared. At this point, if the amount of the kneading water added is too large, the resultant dough bunches up, which makes it difficult, to subsequently prepare a noodle belt or to perform rolling operation, and in addition, which forms excessive foams in a frying treatment due to excessive moisture to accelerate replacement of moisture with a fat or oil, the resultant being easily puffed. A preferable amount of water added in the form of the kneading water depends on the temperature of the dough, and the kneading water is preferably added so that a moisture content in the resultant noodle belt can be 25 to 45% by weight, and more preferably 30 to 40% by weight.

Examples of a method for adding the edible fat or oil of the present invention include a method in which the fat or oil heated if necessary is directly sprayed on the noodle material powder, a method in which the edible fat or oil is separately added in mixing the noodle material powder and the kneading water using a mixer, and a method in which the edible fat or oil is forcedly mixed with the kneading water and the resultant mixture is added to the noodle material powder. When a liquid oil obtained by melting an edible fat or oil that is in a solid form or semi-solid form at ordinary temperature is added, however, the method in which the edible fat or oil is separately added in mixing the noodle material powder and the kneading water using a mixer is preferably employed.

3. Preparation of Noodle Belt

The dough prepared as described above is used for preparing a noodle belt. As for a method for preparing a noodle belt, the dough may be formed into a crude noodle belt using a shaping roller as usually performed, and then the crude noodle belt may be formed into a compounded noodle belt through a compounding roller. But binding and extension of gluten proceeds as the number of times of passing through rollers is increased, and therefore it is preferred that the crude noodle belt be directly used as the noodle belt or that the compounding is not repeated twice or more. In order that a directional property is not imparted to gluten as much as possible, the noodle belt can be produced by extruding the dough using an extruding machine such as an extruder, or by extruding the dough into a small lump and then preparing the small lump into the noodle belt using a shaping roller.

4. Rolling and Cutting

Subsequently, the thus prepared noodle belt is rolled out into a prescribed noodle thickness by performing rolling operation using a roll-out roller three times or less. When the number of times of performing the rolling operation exceeds three times, the binding and the extension in a rolling direction of gluten tissue proceed during the rolling operation, and hence, the puffing of the resultant noodle proceeds. Particularly preferably, the noodle belt is rolled out into a prescribed noodle thickness by performing the rolling operation twice or less. The noodle belt thus having the prescribed noodle thickness is cut with a cutting blade roller, and thus, raw noodle strings are obtained.

5. Gelatinizing Step

Subsequently, the thus obtained raw noodle strings are gelatinized by steaming and/or boiling by an ordinary method. As a steaming method, not only heating with saturated water vapor but also heating with superheated water vapor can be employed, or a step of, for example, dipping the noodle strings in warm water may be employed in combination.

4. Flavoring Step

In the present invention, the noodle strings thus gelatinized can be seasoned by applying a seasoning liquid (a liquid seasoning) thereto by spraying, dipping or the like. This flavoring step need not be always performed but may be omitted.

5. Cutting and Placing

Subsequently, the noodle strings are cut into a length of 20 to 50 cm corresponding to one meal portion. The thus cut noodle strings are placed in a metal fry drying tool called a fry retainer composed of a lid and a container.

6. Fry Drying Step

The fry retainer in which the noodles have been put is moved in a metal tank, called a fryer, holding an edible oil heated to about 130 to 160° C. for dipping the noodles in the oil, and thus, moisture present in the noodles is evaporated for drying the noodles. Examples of the edible oil used here include palm oil and lard. The noodles are dried so that a moisture content of 1 to 8% by weight can be obtained after the fry drying step.

7. Cooling Step

After the fry drying, the lid is removed, and a noodle lump is taken out of the container. The noodle lump taken out is cooled for a prescribed period of time to obtain instant fried noodles.

8. Another Step

The cooled instant fried noodles are transferred to a packaging step to be packaged in a cup or a bag together with a soup and other ingredients, and the resultant is sold as an instant fried noodle product.

As described hereinbefore, a noodle belt is prepared from a noodle dough obtained by kneading a main raw material powder with 20 to 60 ml of a liquid-form edible fat or oil added per kg of the main raw material powder, the noodle belt is rolled out into a prescribed noodle thickness by performing rolling operation three times or less, then the thus rolled noodle belt is cut into noodle strings using a cutting blade, and the thus obtained noodle strings are steamed and fry drying. Thus, the method for producing instant fried noodles that are inhibited from puffing as compared with ordinary fried noodles, and thus have a texture with denseness and high clearness as compared with ordinary fried noodles can be provided.

Now, the present embodiment will be described in more details with reference to examples.

EXAMPLES

Example 1

To 1 kg of a main raw material powder obtained by powder-mixing 900 g of all-purpose flour and 100 g of starch, 350 ml of kneading water containing 15 g of salt, 2 g of kansui, 1 g of phosphate, 2 g of polyphosphate and 0.4 g of a pigment dissolved therein was added, and the resultant was kneaded with a normal pressure mixer for 3 minutes. 20 ml of palm olein oil was added thereto, and the resultant was kneaded further for 12 minutes to prepare a crumbly dough.

The thus produced dough was prepared into a crude noodle belt by using a shaping roller, and two crude noodle belts thus prepared were compounded again using a shaping roller to prepare a noodle belt. At this point, the noodle belt had a thickness of 18 mm.

The thus prepared noodle belt was rolled out into a prescribed thickness of 1.6 mm by performing rolling operation twice using a roll-out roller (from 18 mm to 2.2 mm and then to 1.6 mm). The noodle belt thus rolled out was cut into noodle strings by using a #16 round cutting blade roller.

The noodle strings thus cut were immediately steamed for 30 seconds in a steam chamber to which saturated water vapor was supplied at 240 kg/h, then dipped in warm water at 60° C. for 20 seconds, and thereafter, steamed again for 30 seconds in a steam chamber to which saturated water vapor was supplied at 240 kg/h.

The steamed noodle strings were dipped for 5 seconds in a liquid seasoning containing 60 g of salt and 5 g of sodium glutamate dissolved per L of the liquid seasoning, and then the resultant noodle strings were cut into a length of 30 cm when stretched.

The cut noodle strings were put in a fry retainer, and fry drying by dipping the retainer in a fryer heated to 150° C. for 2 minutes and 30 seconds, and thus, a fried noodle sample was obtained.

Ten points were arbitrarily selected in the noodle cross section of the fried noodle sample, and after degreasing with ether, the cross section of each point was observed with an electron microscope to measure a cross sectional area. The average of the cross sectional areas of the cross section at the ten points was defined as the noodle cross sectional area of the sample.

Example 2

A fried noodle sample was produced in the same manner as in Example 1 except that the amount of the palm olein oil to be added was changed to 30 ml. Besides, a noodle cross sectional area was measured in the same manner as in Example 1.

Example 3

A fried noodle sample was produced in the same manner as in Example 1 except that the amount of the palm olein oil to be added was changed to 40 ml. Besides, a noodle cross sectional area was measured in the same manner as in Example 1.

Example 4

A fried noodle sample was produced in the same manner as in Example 1 except that the amount of the palm olein oil to be added was changed to 50 ml. Besides, a noodle cross sectional area was measured in the same manner as in Example 1.

Example 5

A fried noodle sample was produced in the same manner as in Example 1 except that the amount of the palm olein oil to be added was changed to 60 ml. Besides, a noodle cross sectional area was measured in the same manner as in Example 1.

Example 6

A fried noodle sample was produced in the same manner as in Example 2 except that the number of times of performing the rolling operation was changed to once (from 18 mm to 1.6 mm). Besides, a noodle cross sectional area was measured in the same manner as in Example 1.

Example 7

A fried noodle sample was produced in the same manner as in Example 2 except that the number of times of performing the rolling operation was changed to three times (from 18 mm to 12.6 mm, to 7.2 mm and then to 1.6 mm). Besides, a noodle cross sectional area was measured in the same manner as in Example 1.

Comparative Example 1

A fried noodle sample was produced in the same manner as in Example 1 except that the palm olein oil was not added, and that the number of times of performing the rolling operation was changed to six times (from 18 mm to 15.3 mm, to 12.5 mm, to 9.8 mm, to 7.0 mm, to 4.3 mm, and then to 1.6 mm). Besides, a noodle cross sectional area was measured in the same manner as in Example 1.

Comparative Example 2

A fried noodle sample was produced in the same manner as in Example 1 except that the palm olein oil was not added.

Besides, a noodle cross sectional area was measured in the same manner as in Example 1.

Comparative Example 3

A fried noodle sample was produced in the same manner as in Example 1 except that the amount of the palm olein oil added was changed to 10 ml. Besides, a noodle cross sectional area was measured in the same manner as in Example 1.

Comparative Example 4

A fried noodle sample was produced in the same manner as in Example 2 except that the number of times of performing the rolling operation was changed to six times (from 18 mm to 15.3 mm, to 12.5 mm, to 9.8 mm, to 7.0 mm, to 4.3 mm, and then to 1.6 mm). Besides, a noodle cross sectional area was measured in the same manner as in Example 1.

Comparative Example 5

A fried noodle sample was produced in the same manner as in Example 2 except that a fat or oil to be added was changed to a powder fat or oil derived from palm oil in a solid form (average grain size: 150 μm, specific gravity in a liquid form: 0.92 g/ml) and that 27.6 g of this fat or oil in a powder form was added. Besides, a noodle cross sectional area was measured in the same manner as in Example 1.

Each of the samples of the examples and the comparative examples was cooked and subjected to sensory evaluation for texture and appearance. For the cooking, the fried noodle sample of each test group was put in a container, 400 ml of boiled water was poured into the container, the container was lidded and held for 3 minutes, a powdered soup was put thereinto and the resultant was stirred. Thus, an edible sample was obtained. The evaluation was performed by five experienced panelists according to four scales. The sample of Comparative Example 1 was regarded as an ordinary fried noodle sample and was used as a reference of the evaluation.

As for the evaluation of the texture, a sample having denseness and a very good texture was evaluated as "excellent", a sample having denseness and a good texture was evaluated as "good", a sample having insufficient denseness was evaluated as "fair", and a sample having no denseness and felt hollow similarly to ordinary fried noodles was evaluated as "poor".

As for the evaluation of the appearance, a sample having clearness and a very good appearance was evaluated as "excellent", a sample having clearness and a good appearance was evaluated as "good", a sample having insufficient clearness was evaluated as "fair", and a sample having no clearness similarly to ordinary fried noodles was evaluated as "poor".

The results of the sensory evaluation and the noodle cross sectional areas of the examples and the comparative examples are shown in Table 1.

TABLE 1

| Test Group | Amount of Edible Fat or Oil Added (ml/kg) | Number of Times of Rolling | Cross Sectional Area (mm$^2$) | Texture | Appearance | Comments |
| --- | --- | --- | --- | --- | --- | --- |
| Example 1 | 20 | 2 | 2.58 | Good | Good | Both the appearance and the texture are good. |
| Example 2 | 30 | 2 | 2.54 | Excellent | Excellent | Both the appearance and the texture are very good. |
| Example 3 | 40 | 2 | 2.51 | Excellent | Excellent | Both the appearance and the texture are very good. |
| Example 4 | 50 | 2 | 2.49 | Excellent | Excellent | Both the appearance and the texture are very good. |
| Example 5 | 60 | 2 | 2.27 | Good | Excellent | The appearance is very good, but noodles are rather insufficiently gelatinized and sticky. The noodle belt so easily droops that noodle making is difficult. |
| Example 6 | 30 | 1 | 2.33 | Excellent | Excellent | Both the appearance and the texture are very good. |
| Example 7 | 30 | 3 | 2.75 | Good | Good | Both the appearance and the texture are good. |
| Comparative Example 1 | 0 | 6 | 3.40 | Poor | Poor | Defined as a reference of ordinary fried noodles. The noodles are puffed and have no denseness and feel hollow. |
| Comparative Example 2 | 0 | 2 | 3.04 | Poor | Poor | Similarly to Comparative Example 1, the noodles have no clearness and a hollow texture. |
| Comparative Example 3 | 10 | 2 | 2.91 | Poor | Poor | Similarly to Comparative Example 1, the noodles have no clearness and a hollow texture. |
| Comparative Example 4 | 30 | 6 | 2.82 | Fair | Fair | Slightly better than Comparative Example 1, but with insufficient clearness as well as insufficient denseness. |
| Comparative Example 5 | Powder 27.6 g | 2 | 2.80 | Fair | Fair | Slightly better than Comparative Example 1, but with insufficient clearness as well as insufficient denseness. |

These results reveal that a method for producing instant fried noodles that are inhibited from puffing and thus have a texture with denseness high clearness as compared with ordinary fried noodles can be provided as follows: a noodle belt is prepared from a noodle dough obtained by kneading a main raw material powder with 20 to 60 ml of a liquid-form edible fat or oil added per kg of the main raw material powder, the noodle belt is rolled out into a prescribed noodle thickness by performing rolling operation three times or less, the thus rolled noodle belt is cut into noodle strings using a cutting blade, and the resultant noodle strings are steamed and fry drying. In particular, it is revealed that the number of times of performing the rolling operation is preferably twice or less, and that an amount of the liquid-form fat or oil added is preferably 30 to 50 ml.

As is understood from Comparative Example 5, the effect of inhibiting the puffing in a frying operation is higher in the case where a liquid-form fat or oil is mixed compared to the case where a powder fat or oil is mixed, and it is significant that a fat or oil be in a liquid form at the time of the addition to be homogeneously mixed with the whole noodle dough.

The invention claimed is:

1. A method for producing instant fried noodles, comprising:
    obtaining a noodle belt from a noodle dough by kneading main raw material powder with a liquid-form edible fat or oil added to the main raw material in an amount in a range from 20 to 60 ml per kg of the main raw material powder;
    producing a crude noodle belt from the noodle dough using a shaping roller and producing a compounded noodle belt from the crude noodle belt using a compounding roller;
    rolling out the compounded noodle belt using a roll-out roller into a prescribed noodle thickness by performing a rolling operation of once or twice;
    cutting the rolled noodle belt into raw noodle strings using a cutting blade;
    steaming the raw noodle strings; and
    fry drying the steamed noodle strings.

2. The method for producing instant fried noodles according to claim 1,
    wherein the amount of the liquid-form edible fat or oil added to the main raw material is in a range from 30 to 50 ml per kg of the main raw material powder.

* * * * *